W. R. HOPSON.
VEHICLE WHEEL.
APPLICATION FILED MAY 7, 1917.

1,249,627.

Patented Dec. 11, 1917.

INVENTOR
William R. Hopson.

UNITED STATES PATENT OFFICE.

WILLIAM R. HOPSON, OF BRIDGEPORT, CONNECTICUT.

VEHICLE-WHEEL.

1,249,627.   Specification of Letters Patent.   Patented Dec. 11, 1917.

Application filed May 7, 1917. Serial No. 166,809.

*To all whom it may concern:*

Be it known that I, WILLIAM R. HOPSON, citizen of the United States, residing at Bridgeport, in the county of Fairfield and State of Connecticut, have invented certain new and useful Improvements in Vehicle-Wheels; and I do hereby declare the following to be a full, clear, and exact description of the invention, such as will enable others skilled in the art to which it appertains to make and use the same.

My invention relates to vehicle wheels and particularly to that class wherein the hub portion occupies a floating position with respect to the rim, it being an improvement on the construction set forth in the patent granted me on July 20, 1915, and numbered 1,146,796.

Referring to the drawings.

Figure 1:
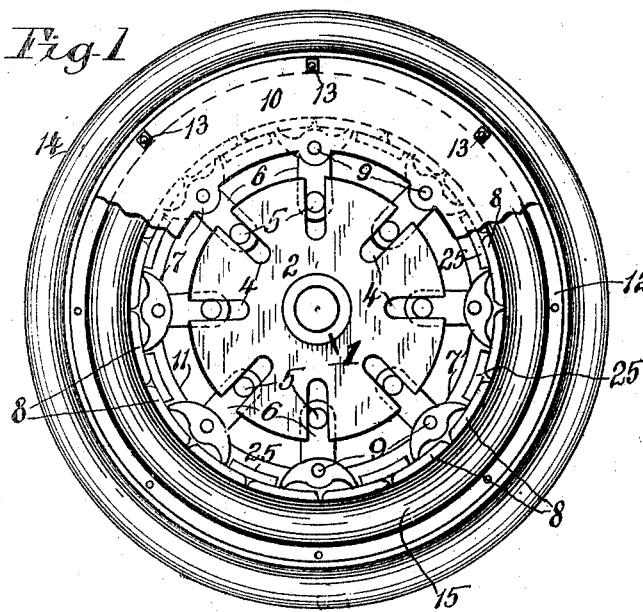
Figure 1 represents an elevation of the wheel showing one of the side plates broken away.
Figure 2:
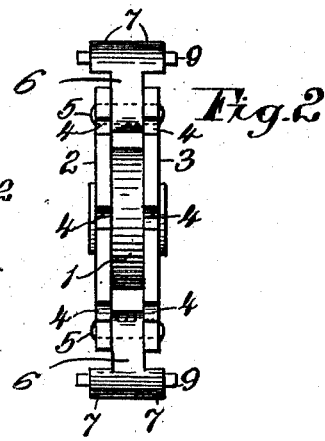
Fig. 2 is a detail view of the floating hub and spokes.

The floating hub is composed of the central portion 1 and the flanges 2—3, having the grooves 4 in which are operatively located the pins 5 carrying the spokes 6 having the laterally projecting arms 7 rigid therewith and contacting with the floating plates 8. The head or arm portion of each spoke is journaled on the pins 9, which pins are located in suitable holes provided in the side plates 10—11 secured to the rim 12 by the bolts 13. 14 is the usual pneumatic tread tire, and 15 is an inner pneumatic tube located between the rim and the plates 8 and in close contact with both. The tread 14 may, however, be of any suitable material and need not be resilient, as all the resiliency required is located within the wheel. Under the rotative action of the wheel, the spokes will oscillate on the pins 9 and give a thrust movement to the plates 8. Under normal conditions the hub remains in the center of the wheel, but when under any sudden shock or stress it is deflected therefrom the grooves 4 will permit such deflection without disturbing the relative position of the spokes with respect to the external mechanism.

In my former patent the compression plates and resilient member were located between the arms of the spokes and the center of the hub, but in my present construction the spokes are reversed; the resilient member is circumferentially enlarged and said member and plates located between the spokes and rim, thus giving greater contact surface and a greater development of power at a much lower tension than could be obtained with the former construction.

Figure 3:
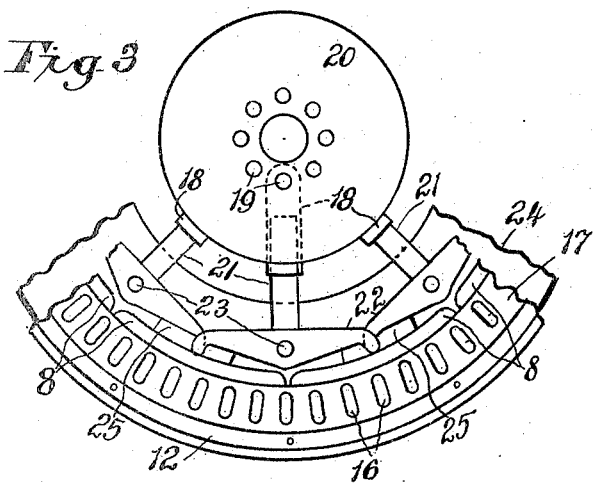
Fig. 3 is a broken view of the wheel showing a modified arrangement of connecting the spokes with the hub.

Any suitable resilient means possessing the necessary flexibility could be substituted for the pneumatic tube. In Fig. 3 the openings 16 give an additional resiliency to the otherwise solid rubber member 17. In this view the resilient member, spokes and floating plates occupy the same relative position with respect to the hub as in Fig. 1. In this modified construction, each pair of spokes engage the same floating plate, and the sleeves 18 are pivotally supported on the pins 19 of the hub 20, and they telescopically engage the spokes 21, which spokes are pivoted on the pins 23 projecting through side plates, one only of said plates, 24, being shown.

To limit the inward movement of the floating plates in either construction, the lugs 25 lie within these plates and may form an integral part of one of the side plates.

Figure 4:
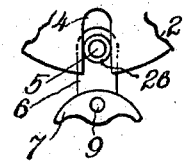
Fig. 4 is broken view of the hub showing a spoke having an antifriction sleeve on the hub pivot.
Figure 5:
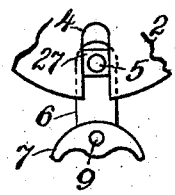
Fig. 5 is broken view of the hub showing a sliding block embracing the spoke pivot.

26, Fig. 4, is an antifriction sleeve which may be mounted on the pivot 5 of the spoke, and 27 is a rectangular sliding block in which the pivot 5 may be journaled.

Having thus described my invention, what I claim is:—

1. In combination, a vehicle wheel having a floating hub and a rigid rim, side plates secured to the rim, spokes pivoted to the hub and to the side plates, arms on the outer ends of the spokes and rigid therewith, said arms turning with the spokes on their outer pivots and engaging a series of floating plates except when lifted therefrom by the oscillation of the spokes, a resilient member concentric with the hub and located between the floating plates and rim and adapted to be compressed by the floating plates under the oscillatory movements of the spokes, and means for limiting the movement of the floating plates in a direction toward the hub.

2. In combination, a vehicle wheel having a floating hub and a rigid rim, side plates secured to the rim, spokes pivoted to the hub and to the side plates, arms on the outer ends of the spokes and rigid therewith, said arms turning with the spokes on their outer pivots, floating plates, each plate engaging one of the arms of each of two pivoted spokes when not lifted therefrom by the oscillations of the spokes, a resilient element located between said plates and rim adapted to be compressed by said plates under the oscillatory movements of the spokes, and means for limiting the movement of said plates in a direction toward the hub.

In testimony whereof I affix my signature.

WILLIAM R. HOPSON.